Patented Oct. 30, 1934

1,978,953

UNITED STATES PATENT OFFICE 1,978,953

METHOD OF PREPARING AN ALKALI METAL PERBORATE

James McKeown, Woodbridge, N. J., assignor, by mesne assignments, to E. I. du Pont de Nemours and Company, a corporation of Delaware No Drawing. Application October 17, 1928, Serial No. 313,176

2 Claims. (Cl. 23—60)

This invention relates to the production of a new composition of matter and has for its object the preparation of a new material having a high active oxygen content. Specifically the invention concerns a product made from borax and hydrogen peroxide and the process of preparing it.

My new product is only slightly hygroscopic; is not deliquescent; has an alkalinity less than that of borax; is very stable; and liberates its active oxygen slowly and uniformly from a heated water solution. It is practically odorless and tasteless, and has substantially no irritating effect on the skin or mucous membranes.

In referring to the oxygen content of my new material, I distinguish between "active oxygen" and total oxygen. Thus, e. g. sodium perborate ($NaBO_3.4H_2O$), which can be made from borax, sodium hydroxide and hydrogen peroxide, has a total oxygen content 72.6%, whereas the "active" oxygen or the oxygen available for oxidation is 10.4%. My new material can be made with an active oxygen content ranging from 5% to 23%.

I prepare my product by evaporating to dryness an aqueous solution of borax and hydrogen peroxide. I have found that the evaporating step must be carefully controlled to minimize losses of peroxide. This evaporation can be accomplished at low temperatures and pressures below atmospheric, or, if the evaporation be rapid, such as in a film evaporator, slightly higher temperatures at atmospheric pressure can be utilized. Thus, e. g. under a vacuum for a considerable period it is desirable to maintain the temperature below 60° C.; temperatures as high as 80° C. can be utilized so as to give a more rapid rate of evaporation, but the oxygen losses will be higher than at 60° C. With a film evaporator, where the water is removed rapidly from thin layers either at atmospheric pressure or below, the losses are not excessive up to 80° C. After the product has been evaporated to dryness by either of these methods, it can, if necessary, be given a final drying without appreciable decomposition at higher temperatures.

The evaporation must of course be carried out in vessels of materials having no appreciable decomposing effect on hydrogen peroxide; such materials as quartz, glass, tin or aluminum are suitable. I have found that various hydrogen peroxide stabilizers also aid in securing high oxygen yields by retarding the rate of decomposition of $H_2O_2$. Thus, a small amount of magnesium silicate has a very beneficial effect on the reaction and has no deleterious action on the product.

I have been unable to crystallize the material by cooling from dilute or concentrated solutions; complete evaporation being required. The residue on evaporation, is a somewhat porous mass which can be ground. The following examples illustrate my methods of preparation:

I. 382 grams (1 mol) U. S. P. borax were dissolved in 458 grams 108 volume hydrogen peroxide (4 mols) and the solution evaporated to dryness at about 49° C. in aluminum pans under a pressure of about 2 inches mercury. 295 grams dry product was obtained which analyzed 17.72% active oxygen giving a yield on the oxygen basis of 81.7%. This product analyzed 20.12% $Na_2O$ and 44.25% $B_2O_3$. I believe the product thus obtained to be substantially:

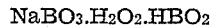

$NaBO_3.H_2O_2.HBO_2$

The theoretical composition of this compound is:

| | Percent |
|---|---|
| Active oxygen | 20 |
| $B_2O_3$ | 43.75 |
| $Na_2O$ | 19.38 |
| Balance water | |

II. A run was made using quantities, temperatures and other conditions as above, but with the addition of 4 grams of magnesium silicate to the solution. This resulted in 316 grams dry product containing 18% active oxygen; $Na_2O$—20.13%; $B_2O_3$—44.39%; a yield on the oxygen basis of 88.9%.

III. 382 grams of borax (1 mol) were dissolved in 153 grams (4½ mols) $H_2O_2$ to which 2.5 grams of magnesium silicate was added. This batch was evaporated in 3 portions at atmospheric pressure. A.—Dried at 60–70° C. for 15 minutes in a thin film on a glass plate. The product analyzed 19.2% active oxygen. B.—Dried at 80° C. for 15 minutes on glass plates; product analyzed 18.96% active oxygen. C.—100 grams of the liquor were dried in 1 hour at 80° C. in a laboratory drum dryer; the product analyzed 18.52% active oxygen.

IV. 191 grams U. S P. borax (½ mol) was placed in a rotary drum dryer and to this was added 61.1 grams of 27.8% $H_2O_2$ (½ mol.) containing 2 grams magnesium silicate. A heavy slurry formed at first which after heating for a short time, formed a very heavy liquid. Drying was started at 70° C. and raised to 110° C. for a period of 45 minutes at the end of which time the product was solid. This was now heated for a period of about 2½ hours at a temperature of 100° C. to complete the drying. 130 grams of product was obtained which analyzed 5.36% active oxygen giving an oxygen yield of about 87%.

V. Borax used in this example was first dehydrated for 15 hours at 150° C. 114 grams (½ mol) of this dehydrated borax was dissolved in 268 grams of 275 volume $H_2O_2$ (5 mols). This charge was evaporated at 47–48° C. at a pressure of about 2 inches mercury in a period of 5 hours. 162 grams product were recovered which analyzed 22.72% active oxygen, 18.6% $Na_2O$, 41.8% $B_2O_3$. The yield on the oxygen basis was 46%.

The product of this example is typical of the high oxygen content materials which I have obtained. I have found that these high oxygen content products (19–23% active oxygen) lose active oxygen somewhat more rapidly than the lower active oxygen materials until they have approached an active oxygen content of 17–18%; after which they lose active oxygen very slowly, behaving substantially as do materials originally containing this active oxygen content.

I have prepared a great many compositions by this process of evaporating an aqueous solution of borax and hydrogen peroxide, and have found that variations in the ratios between borax and hydrogen peroxide gives products of varying active oxygen content, and with varying yields as shown by the following table:

| Borax mols | $H_2O_2$ mols | Product percent $O_2$ | Oxygen yield % |
|---|---|---|---|
| 1 | 1 | 5.36 | 87 |
| 1 | 2 | 10.24 | 98.5 |
| 1 | 3 | 13.2 | 87.7 |
| 1 | 4 | 17.84 | 90.65 |
| 1 | 5 | 19.4 | 84.65 |
| 1 | 8 | 22.2 | 64.5 |
| 1 | 10 | 22.72 | 46 |

I have found in general that the highest active oxygen content consistent with the highest yields are obtained when using approximately 3–5 mols of hydrogen peroxide per mol of borax; the oxygen content of the products obtained with these ratios consistently run from 13–19% active oxygen. I have found that the most stable compound is one formed with 4 mols $H_2O_2$ and having an $O_2$ content of approximately 17.5%. Regardless of the active oxygen content, I have found, on analysis, that the ratio of sodium to boron in the composition was substantially 1 atom sodium to 2 atoms of boron.

In consequence of the method of manufacture of my material I have called it borax peroxide.

Borax peroxide, regardless of its active oxygen content, is less alkaline than sodium perborate or borax itself as determined by the La Motte colorimetric method. Decomposition by boiling an aqueous solution increased the alkalinity. An aqueous solution of borax peroxide (18% active $O_2$) containing 15.1 grams per liter gave pH determinations as follows: metal cresol purple pH 8.6; thymol blue pH 8.7. The boiled aqueous solution gave values of 9.0 and 9.1 respectively; a M/20 borax solution under similar conditions gave pH values of 9.2 and 9.3 respectively with these indicators. This 18% borax peroxide is then about fourteen times less alkaline than sodium perborate and about six times less alkaline than borax.

This low alkalinity in the material itself and in its decomposition residues explains the absence of irritating effects on the skin, mucous membranes and the like. The value and utility of such a substance having an alkalinity less than borax, but an active oxygen content far above that of sodium perborate are obvious. The action is so mild that the solid substance can be placed on the tongue or eaten with no ill effect or noticeable action. This is due in part to the relative stability of the substance—the oxygen being released at only a moderate speed.

As a result of the above characteristics this material is exceedingly useful where oxidizing actions such as previously obtained by sodium perborate or hydrogen peroxide are desired and is of greater usefulness where a low alkalinity is required. I have utilized the material in tooth-pastes and powders, face creams, and the like, and for bleaching.

I claim:

1. The process of preparing a product containing active oxygen which comprises evaporating to dryness an aqueous solution containing borax and hydrogen peroxide in the ratio of 1 mol of borax to 3 to 5 mols hydrogen peroxide.

2. The process of preparing a product containing active oxygen which comprises evaporating to dryness at a temperature below 80° C. an aqueous solution containing borax and hydrogen peroxide in the ratio of approximately 1 mol of borax to 3 to 5 mols of hydrogen peroxide.

JAMES McKEOWN.